United States Patent
Ozugur

(10) Patent No.: US 7,289,463 B2
(45) Date of Patent: Oct. 30, 2007

(54) HIERARCHICAL WIRELESS NETWORK AND AN ASSOCIATED METHOD FOR DELIVERING IP PACKETS TO MOBILE STATIONS

(75) Inventor: Timucin Ozugur, Garland, TX (US)

(73) Assignee: Alcatel Lucent, Paris (FR)

( * ) Notice: Subject to any disclaimer, the term of this patent is extended or adjusted under 35 U.S.C. 154(b) by 1116 days.

(21) Appl. No.: 10/135,664

(22) Filed: Apr. 30, 2002

(65) Prior Publication Data

US 2003/0202505 A1    Oct. 30, 2003

(51) Int. Cl.
*H04Q 7/00*    (2006.01)
(52) U.S. Cl. ........................ 370/328; 370/349
(58) Field of Classification Search ............. 370/310, 370/310.2, 328, 331, 338, 349, 382, 389, 370/392, 401, 395.31, 395.52, 395.54, 402, 370/351–358
See application file for complete search history.

(56) References Cited

U.S. PATENT DOCUMENTS

| | | | |
|---|---|---|---|
| 5,636,220 A | 6/1997 | Vook et al. | |
| 5,901,362 A | 5/1999 | Cheung et al. | |
| 5,970,059 A | 10/1999 | Ahopelto et al. | |
| 6,272,148 B1* | 8/2001 | Takagi et al. | 370/469 |
| 2003/0091011 A1* | 5/2003 | Roberts et al. | 370/338 |

FOREIGN PATENT DOCUMENTS

| | | |
|---|---|---|
| EP | 0 917 320 A2 | 5/1999 |
| EP | 1 011 243 A1 | 6/2000 |
| EP | 1 030 491 A2 | 8/2000 |
| WO | WO 00/41418 | 7/2000 |
| WO | WO 01/08359 A1 | 2/2001 |
| WO | WO 01/22766 A1 | 3/2001 |

OTHER PUBLICATIONS

Wu, et al.; Caching Location Data in Mobile Networking; Proceedings of the IEEE Workshop on Advances in Parallel and Distributed Systems; Oct. 6, 1993; pp. 71-76.

* cited by examiner

*Primary Examiner*—Brenda Pham
(74) *Attorney, Agent, or Firm*—Craig A. Hoersten; Jessica W. Smith

(57) ABSTRACT

A hierarchical wireless network is comprised of two levels, a first level configured for wired coupling to an IP network and comprised of a gateway configured for wired coupling to the IP network, a WiARP server and a data store; and a second level, wired to the first level by a distribution system, and comprised of at least two access points, each configured for wireless association with a respective plurality of mobile stations and having a WiARP proxy residing therein. For each mobile station associated with the second level, the WiARP server maintains an IP address of the mobile station and a MAC address for the access point with which the mobile station is associated. Conversely, each WiARP proxy maintains, on behalf of the associated access point, IP and MAC addresses for each mobile station associated therewith.

27 Claims, 4 Drawing Sheets

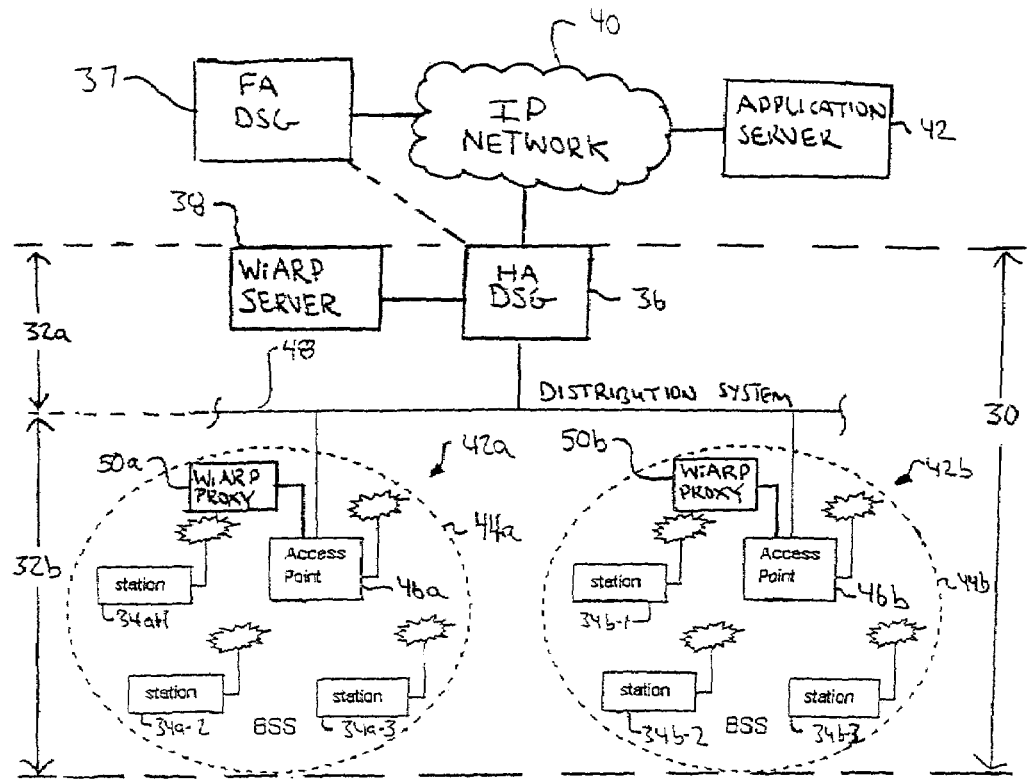

FIG. 2

| | WiARP SERVER TABLE | |
|---|---|---|
| 54-1 | IP ADDRESS OF MS No. 1 SERVED BY DISTRIBUTION | 802 MAC ADDRESS OF AP SERVING MS No. 1 |
| 54-2 | IP ADDRESS OF MS No. 2 SERVED BY DISTRIBUTION | 802 MAC ADDRESS OF AP SERVING MS No. 2 |
| 54-X | IP ADDRESS OF MS No. X SERVED BY DISTRIBUTION | 802 MAC ADDRESS OF AP SERVING MS No. X |

Fig. 3a

| | WiARP PROXY TABLE | |
|---|---|---|
| 58-1 | IP ADDRESS OF MS No. 1 SERVED BY AP | 802 MAC ADDRESS FOR MS No. 1 |
| 58-2 | IP ADDRESS OF MS No. 2 SERVED BY AP | 802 MAC ADDRESS FOR MS No. 2 |
| 58-y | IP ADDRESS OF MS No. Y SERVED BY AP | 802 MAC ADDRESS FOR MS No. Y |

Fig. 3b

HIERARCHICAL WIRELESS NETWORK AND AN ASSOCIATED METHOD FOR DELIVERING IP PACKETS TO MOBILE STATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a hierarchical wireless network and, more particularly to a hierarchical wireless network in which selected wireless address resolution protocol (WiARP) functionality is implemented within a wireline backbone to the hierarchical wireless network. By implementing WiARP messaging in the wireline backbone, both wireless resources and battery life of mobile stations operating within the wireless network are conserved.

BACKGROUND OF THE INVENTION

In recent years, the number of intelligent mobile devices, for example, pagers, smart wireless telephones, laptop computers and personal digital assistants ("PDAs"), has increased dramatically. Together with the increasing number of intelligent mobile devices has come increased interest in the delivery of internet protocol ("IP") data and services to such devices. However, there remain significant network architecture issues which affect the delivery of IP data packets over wireless networks such as wireless local area networks ("WLANs"). One such issue relates to the ability of the wireless network to locate the desired recipient of an IP data packet. Heretofore, the problems experienced by the wireless network when attempting to locate a mobile station have resulted in significant waste of wireless resources. Because the wireless network is often unsure of the location of a mobile station, the mobile station must be paged by plural access points even though the mobile station is in communication with only one such access point. Such an approach to locating mobile stations unnecessarily consumes wireless resources since bandwidth which could be dedicated to delivering IP data packets must instead be used to page the mobile stations. This approach also contributes to a shortened battery life for mobile stations. When inactive, a mobile station will often enter a power-save mode to conserve battery life. However, whenever a page is broadcast by its access point, the mobile station must wake-up and check each such page to determine if it is directed to them. As a result, the mobile station must consume much more power than if it was allowed to stay in the power-save mode.

Because of these shortcomings in current wireless IP techniques, many wireless IP applications have not been implemented. Accordingly, by configuring a wireless network into a hierarchical architecture having plural levels and implementing selected WiARP functionality in each level, a wireless network in which an IP data packet can be delivered to a mobile station without the need to resort to the broadcasting functions which characterized prior wireless network architectures may be achieved.

SUMMARY OF THE INVENTION

The present invention is directed to a hierarchical wireless network and an associated method for unicast delivery of IP data packets to mobile stations associated with access points of the wireless network. The hierarchical wireless network is comprised of two levels, a first level configured for wired coupling to an IP network and a second level, wired to the first level by a distribution system, configured for wireless association with a plurality of mobile stations. For each mobile station associated with the second level, the first level maintains a wireline address, within the second level, for the mobile station while the second level maintains a wireless address for the mobile station associated therewith.

In various aspects of the hierarchical wireless network, the first level may include a gateway configured for wired coupling to the IP network, a WiARP server and a data store while the second level may include at least two access points configured for wireless association with a respective plurality of mobile stations. For each mobile station associated with the wireless level by one of the access points, the first level maintains, for example, within the data store, an IP address of the mobile station and a MAC address for the access point to which the mobile station is associated. Each access point maintains, again, for example, within a data store, IP and MAC addresses for each mobile station associated therewith.

Upon receipt of an IP data packet to be delivered to a mobile station, the gateway issues a WiARP query containing the IP address of the mobile station to the WiARP server. In turn, the WiARP server checks the data store for a matching IP address. If a matching IP address is identified, the WiARP server issues a WiARP response message to the gateway which contains the MAC address of the access point linked to the matching IP address. The gateway then delivers the IP data packet to the access point having the provided MAC address. Upon receipt of the IP data packet, the access point issues a WiARP proxy query containing the IP address of the mobile station to the WiARP proxy. The data store at the access point is checked for a matching IP address and, if a matching IP address is identified, the access point delivers the IP data packet to the mobile station having the MAC address linked to the matching IP address.

DESCRIPTION OF DRAWINGS

FIG. 2 is a block diagram of a hierarchical wireless network constructed in accordance with the teachings of one aspect of the present invention.

FIG. 3a is a WiARP server table maintained by a WiARP server of the hierarchical wireless network of FIG. 2.

FIG. 3b is a WiARP proxy table maintained by an access point of the hierarchical wireless network of FIG. 2.

DETAILED DESCRIPTION OF THE INVENTION

Figure 1:
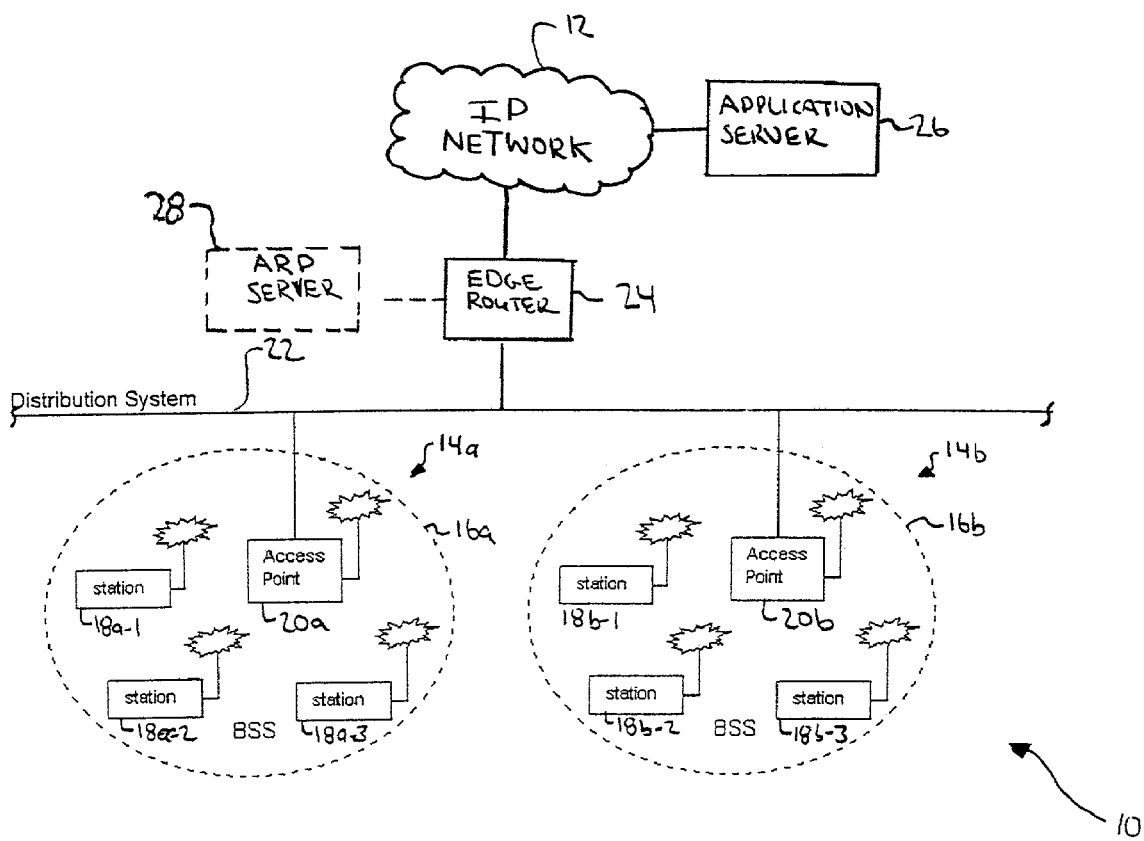
FIG. 1 is a block diagram of a current implementation of a wireless network.

FIG. 1 illustrates a current implementation of the interconnection of a wireless network 10 to an IP network 12 such as the Internet. As may now be seen, the wireless network 10, which preferably has a network architecture which conforms to IEEE Standard 802.11, is comprised of plural basic service sets ("BSSs"), each of which provides wireless service to a defined geographical area. For example, in FIG. 1, BSS 14a provides wireless service to geographical area 16a and BSS 14b provides wireless service to geographical area 16b. Of course, the wireless network 10 may include any number of BSSs and FIG. 1 illustrates only two such BSSs purely for ease of illustration. FIG. 1 further illustrates the BSS 14a as being comprised of plural stations 18a-1, 18a-2, 18a-3 and an access point 20a. Similarly, FIG. 1 illustrates the BSS 14b as being comprised of plural stations 18b-1, 18b-2, 18b-3 and an access point 20b. Of course, a BSS may be comprised of any number of stations and, as before, FIG. 1 shows the BSSs 14a and 14b as comprised of three such stations purely for ease of illustration.

The station is the most basic component of a BSS. A station may be any device that contains the functionality of the 802.11 protocol, specifically, the media access control ("MAC") and physical ("PHY") layers for a LAN with wireless connectivity, and a connection to the wireless media. Typically, the 802.11 functionality is implemented in the hardware and software of a network interface card ("NIC"). As defined herein, a station may be a laptop computer, a PDA or other handheld device or an access point. All stations support the 802.11 services of authentication, de-authentication, privacy and data delivery. Stations may be mobile, portable, or stationary. As disclosed herein, however, the stations 18a-1, 18a-2, 18a-3, 18b-1, 18b-2 and 18b-3 are all mobile stations while the access points 20a and 20b are stationary. The mobile stations 18a-1, 18a-2 and 8a-3 of the BSS 14a all communicate with the access point 20a. Similarly, the stations 18b-1, 18b-2 and 18b-3 of the BSS 14b all communicate with the access point 20b.

The access points 20a, 20b provides local relay functionality for the BSSs 14a, 14b, respectively. Thus, all data to be exchanged between the mobile stations 18a-1, 18a-2, 18a-3 of the BSS 14a is relayed by the access point 20a. Similarly, all data to be exchanged between the mobile stations 18b-1, 18b-2, 18b-3 of in the BSS 14b is relayed by the access point 20b. In addition to local relay functionality, each access point 20a, 20b connects the respective BSS 14a, 14b to a backbone commonly referred to as distribution system 22. While the distribution system 22 may be variously configured, preferably, the distribution system 22 is a wireline network having an architecture which conforms to IEEE Standard 803.2. Finally, the access points 20a, 20b provide distribution services, including association, disassociation, reassociation, distribution and integration, for stations within the BSSs 14a, 14b.

The distribution system 22 is the means by which one access point, for example, the access point 20a, communicates with another access point, for example, the access point 20b, to exchange data on behalf of mobile stations in their respective BSSs, forwards data to follow mobile stations as they move from one BSS to another and exchanges data with a wired network such as the IP network 12. When an IP data packet is placed on the IP network 12, for example, by application server 26, for transmission to a mobile station, for example, the mobile station 18a-1, operating in the wireless network 10, the IP network 12 routes the data packet to an edge router 24 which couples the wireless network 10 to the IP network 12. From the edge router 24, the IP data packet must be routed, over the distribution system 22, to the access point for the BSS in which the mobile station 18a-1 is operating.

Difficulties arise at the edge router 24, however, because the edge router 24 is unaware of the 802.11 MAC address for either the mobile station 18-1a itself or the access point serving the mobile station 18a-1. For example, the mobile station 18a-1 may have initially associated itself with the access point 20b but has since disassociated itself from that access point. Later, after moving into the operating range of the access point 20a, the mobile station 18a-1 has again associated itself with an access point, this time, however, with the access point 20a. In order to deliver the incoming IP data packet to the mobile station 18-1a, the edge router 24 must insert the IP data packet into the 802.11 MAC frame structure and broadcast the frame throughout all of the BSSs 14a, 14b coupled to the distribution system 22. In turn, the access points 20a and 20b, respectively, broadcast the frame throughout the BSS 16a, 16b using a delivery traffic indication message ("DTIM"). Whether or not they are the intended destination thereof, all of the mobile stations 18a-1 through 18a-3, 18b-1 through 18b-3 operating within the respective BSS 14a, 14b process the broadcasted DTIM message. However, many of the mobile stations may be in a "power-save" mode when the DTIM message is broadcast. If so, upon detecting the DTIM broadcast message, the mobile stations will wake up, process the DTIM message and, if they are not the intended recipient, return to the power-save mode.

The aforementioned process represents a significant waste of resources, particularly when one considers that many such messages are generated by an access point for a BSS. As a result, the battery life of mobile stations operating within the wireless network is shortened considerably. Furthermore, the process unnecessarily consumes wireless resources within the wireless network as bandwidth which could have been dedicated to data exchanges must instead be used for mobile IP paging.

One proposed solution to this deficiency in current wireless network architecture is illustrated in phantom in FIG. 1. The illustrated solution involves the use of an address resolution protocol ("ARP") server 28 coupled to the edge router 24 serving the distribution system 22. The ARP server 28 includes an ARP cache (not shown) in which the MAC addresses of a mobile station and the access point serving it may be maintained. As currently implemented, however, the ARP server 28 is updated whenever the edge router 24 is involved in the communication. However, as most wireless communications stay within the wireless network 10 and do not involve the edge router 24, the information in the ARP cache will become outdated unless periodically refreshed by broadcasting an ARP message throughout the distribution system 22. However, by broadcasting ARP messages throughout the distribution system 22 to obtain updated MAC addresses for mobile stations and the access points serving them, the ARP server 28, in effect, consumes the very wireless resources and battery power which it intended to conserve.

Referring next to FIG. 2, a hierarchical wireless network 30 constructed in accordance with the teachings of the present invention will now be described in greater detail. As may now be seen, the hierarchical wireless network 30 is comprised of a first, or wireline, level 32a configured for wired coupling to IP network 40 and a second, or wireless, level 32*b* configured for wireless coupling to mobile stations 34*a*-1 through 34*b*-3. The first level 32*a* is comprised of a distribution system gateway ("DSG") 36 and a WiARP server 38. The DSG 36 provides a wired interface between the wireless network 30 and the IP network 40 while the WiARP server 38 maintains a wireline address, within the first level 32*a* for mobile stations associated with the wireless network 30. If the DSG 36 receives an IP data packet addressed to a mobile station for which the DSG 36 serves as a home agent ("HA") therefore, using information maintained by the WiARP server 38, and in a manner that will be more fully described below, the DSG 36 will route the received IP data packet addressed to the access point to which the mobile station is associated. Of course, in a further embodiment of the invention, the WiARP server 38 may maintain similar information for mobile stations for which the DSG 36 serves as a foreign agent ("FA") therefore, thereby enabling the DSG 36 to route received IP data packets to the appropriate access point to which a mobile station is associated regardless of whether the DSG 36 is the HA or FA for the mobile station operating within the wireless network 30.

FIG. 2 also shows a second DSG 37 coupled to the IP network 40. If a mobile station for which the DSG 36 serves as an HA therefore, becomes associated with an access point (not shown) which interfaces with the IP network 40 through the DSG 37, the DSG 37 will serve as the FA for that mobile station. When the DSG 37 serves as the FA for a mobile station having the DSG 36 as its HA, IP data packets destined for the mobile station which are received by the DSG 36 will be routed directly to the DSG 37 without use of the information maintained by the WiARP server 38. Thus, the WiARP server 38 need not maintain information on mobile stations when they are being served by FA DSGs. It should be noted that the designation of the DSG 36 as an HA and the designation of the DSG 37 as an FA is purely arbitrary based upon their respective relationship to the mobile stations served by the DSG 36. Accordingly, it should be clearly understood that the DSG 37 may form part of a hierarchical wireless network, entirely discrete from the hierarchical wireless network 30 but similarly comprised of a first, or wireline, level which includes, in part, the DSG 37 and a second, or wireless, level 32 (not shown) and configured in the manner hereinbelow described with respect to the hierarchical wireless network 30. It should be further understood that the hierarchical wireless network 30 and the hierarchical wireless network which includes the DSG 37 may form respective hierarchical sub-networks of a larger network not fully illustrated herein.

As illustrated in FIG. 2, the second level 32*b* is comprised of a first BSS 42*a*, which provides wireless service to a first geographical area 44*a*, and a second BSS 42*b*, which provides wireless service to a second geographical area 44*b*. Of course, it is fully contemplated that the second level 32*b* of the wireless network 32 may include any number of BSSs and that FIG. 2 shows only two such BSSs purely for ease of illustration. The BSS 44*a* is comprised of stations 34*a*-1, 34*a*-2, 34*a*-3 and access point 44*a*. Similarly, the BSS 44*b* is comprised of stations 34*b*-1, 34*b*-2, 34*b*-3 and access point 46*b*. Again, it is fully contemplated that each of the BSSs 44*a* and 44*b* may have any number of stations and that FIG. 2 shows only three stations in each of the BSSs 44*a* and 44*b* purely for ease of illustration. Stations may be mobile, portable, or stationary. As disclosed herein, however, the stations 34*a*-1, 34*a*-2, 34*a*-3, 34*b*-1, 34*b*-2 and 34*b*-3 are all mobile stations while the access points 46*a* and 46*b* are stationary.

The second level 32*b* is coupled to the first level 32*a* by a distribution system 48. As before, the distribution system 48 is preferably a wireline network having an architecture which conforms to IEEE Standard 803.2. In accordance with the embodiment of the invention disclosed in FIG. 2, the WiARP server 38 is shown as being coupled to the DSG 36 which, in turn, is shown as being coupled to the distribution system 48. Rather than having both components of the first level 32*a* coupled to one another, in an alternate embodiment of the invention, it is contemplated that the DSG 36 and the WiARP server 38 are separately coupled to the distribution system 48. In further accordance with the embodiment of the invention disclosed in FIG. 2, while forming part of the BSSs 42*a* and 42*b*, respectively, each of the access points 46*a* and 46*b* are also wired to the distribution system 48. It should be clearly understood, however, that the access points 46*a* and 46*b* are wired to the distribution system 48 purely by way of example. Accordingly, in an alternate embodiment of the invention not illustrated herein, one or more of the access points 46*a* and 46*b* may be wirelessly coupled to the distribution system 48.

The access points 46*a*, 46*b* provides local relay functionality for the BSSs 44*a* and 44*b*, respectively. Thus, data to be exchanged between first and second mobile stations in the BSS 44*a* is relayed between the stations by the access point 46*a*. Similarly, data to be exchanged between first and second mobile stations in the BSS 44*b* is relayed between the stations by the access point 46*b*. Additionally, the access points 46*a*, 46*b* provide distribution services supported by the IEEE 802.11 standard, including association, reassociation and disassociation, for the mobile stations within the BSSs 44*a*, 44*b*, respectively. The association service is used to make a logical connection between a mobile station and an access point. Accordingly, a mobile station can be associated with only one access point. Before a mobile station is allowed to send a data packet to the distribution system 48 via an access point, the mobile station must become associated with that access point. The association service provides mobile station-to-access point mapping to the distribution system 48. Thus, association is necessary in order for the distribution system to know where and how to deliver data to the mobile station. Association can only be invoked by the mobile station once, typically when the mobile station enters the BSS. Association is sufficient to support a static mobile station, i.e., a mobile station moving locally within a single BSS.

Reassociation enables a mobile station to change its current association with an access point. The reassociation service is invoked to move a current association from one access point to another access point, thereby keeping the distribution system 48 informed of the current mapping between the mobile station and its access point as the mobile station moves from one BSS to another BSS. The reassociation service is invoked by the mobile station. The reassociation service is similar to the association service, except that it includes information about the access point with which a mobile station has been previously associated. By using the reassociation service, a mobile station provides information to the access point to which it will be associated and information pertaining to the access point with which it will be disassociated. This allows the newly associated access point to contact the previously associated access point, for example, to obtain frames that may be waiting there for delivery to the mobile station, as well as other information that may be relevant to the new association.

The disassociation service is a notification that an existing association is to be terminated. The disassociation service is either used by an access point to force a mobile station to eliminate an association with the access point or by a mobile station to inform an access point that it no longer requires the services of the distribution system. Disassociation may be invoked by either the mobile station or the access point and, once invoked by one party; it cannot be refused by the other. When a mobile station becomes disassociated, it must begin a new association before being able to communicate with an access point again.

Coupled to each access point 46*a*, 46*b* is a WiARP proxy 50*a*, 50*b* which, as will be more fully described below, maintains the information necessary for the corresponding access point 46*a*, 46*b* to route an IP data packet received thereby to a mobile station associated therewith. Furthermore, when combined with the information maintained in the WiARP server 38, the information maintained by the WiARP proxy 50*a*, 50*b* look-up table 50*a*, 50*b* enables an IP data packet to be routed to any mobile station associated operating within the wireless network 10 and associated with one of the access points 46*a*, 46*b* thereof. As disclosed herein, the WiARP proxy 50*a*, 50*b* may be a cache or other type of data store, for example, a look-up table, which resides in the corresponding access point 46*a*, 46*b* and is accessible by a processor subsystem (not shown) thereof. Of course, it is fully contemplated that the WiARP proxy 50*a*, 50*b* may have a wide variety of configurations other than those specifically disclosed herein.

Referring next to FIGS. 3*a-b*, the information maintained by the WiARP server 38 and the WiARP proxies 50*a*, 50*b* will now be described in greater detail. The WiARP server 38 includes a memory subsystem (not shown) in which a WiARP server cache (or other type data store) 52, for example, a look-up table, is maintained. The WiARP server look-up table 52 includes a plurality of entries 54-1 through 54-*x*, each including a first field and a second field. Each entry, for example, the entry 54-1, of the WiARP server look-up table 52 contains an IP address for a mobile station operating within the wireless network 10 in a first field thereof and, in a second field thereof, an 802 MAC address for the access point currently serving the mobile station bearing the IP address set forth in the first field. Of course, rather than plural field entries, the WiARP server look-up table 52 may instead store each IP address for a mobile station and corresponding 802 MAC address for a serving access point at respective locations within the data store and map each IP address to the corresponding 802 MAC address.

Each WiARP proxy 50*a*, 50*b* maintains a WiARP proxy cache (or other type of data store) 56, again, for example, a look-up table. If, as configured in the disclosed embodiment, the WiARP proxy 50*a*, 50*b* forms part of the corresponding access point 46*a*, 46*b*, the WiARP proxy look-up table 56 may be maintained at a discrete location within a memory subsystem (not shown) for the access point. The WiARP proxy look-up table 56 includes a plurality of entries 58-1 through 58-*y*, each including a first field and a second field. Each entry, for example, the entry 58-1, of the WiARP proxy look-up table 56 contains an IP address for a mobile station being served by the access point and an 802 MAC address for the mobile station bearing the IP address set forth in the first field. Of course, rather than plural field entries, the WiARP proxy look-up table 56 may instead store each IP address for a mobile station served by the access point and corresponding 802 MAC address for the mobile station at respective locations within the memory and then map each IP address to the corresponding 802 MAC address.

Figure 4A:
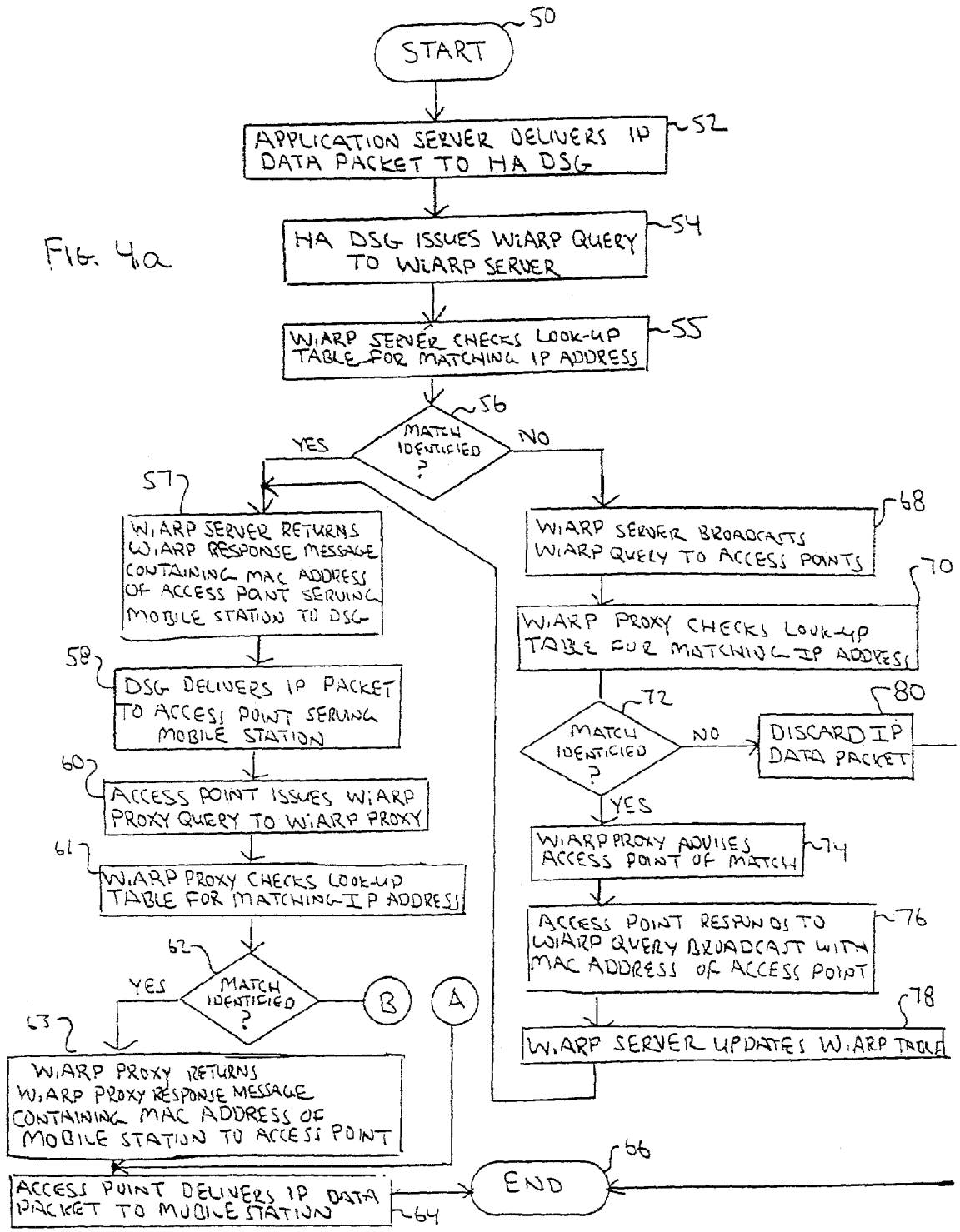
FIGS. 4a-b is a flowchart of a method for delivering an IP packet to a MS in accordance with the teachings of another aspect of the present invention.
Figure 4B:
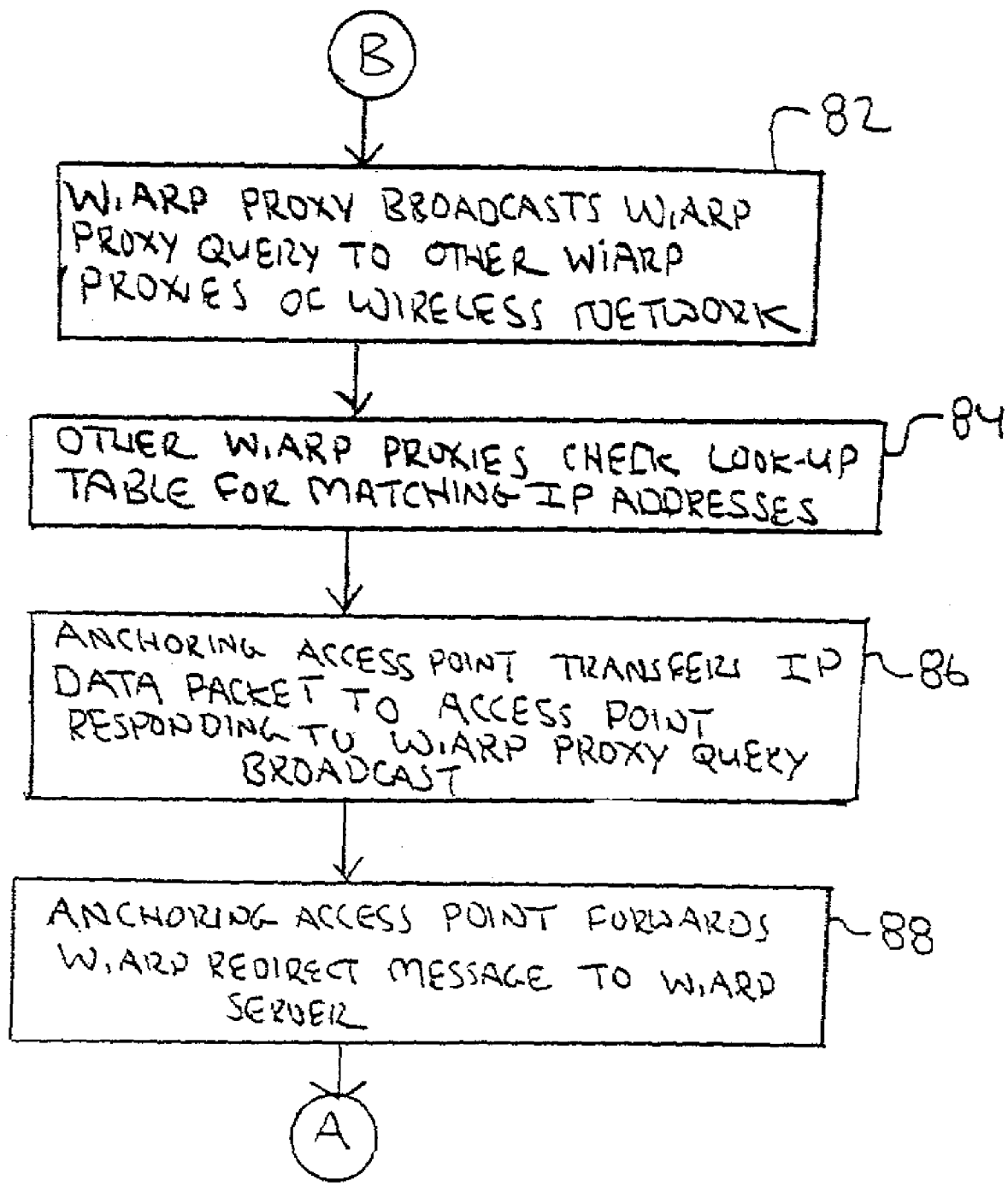

Referring next to FIG. 4, a method of delivering of an IP data packet from an application server, for example, an application server 42, to a mobile station, for example, the mobile station 34*b*-2, in accordance with one embodiment of the present invention will now be described in greater detail. Delivery of the IP data packet in the manner set forth herein is oftentimes termed as a "unicast" delivery of the IP data packet in that, apart from a limited number of "failure" conditions to be discussed later, delivery of the IP data packet does not involve the broadcasting of a message, for example, a page, to plural recipients, for example, mobile stations. As previously set forth, before the mobile station can send or receive a data packet, it must first associate with an access point. If the mobile station 34*b*-2 is located within the geographical area 44*b* when it initiates association, the mobile station 34*b*-2 will become associated with the access point 46*b*. At the time of association, the mobile station 34*b*-2 provides the access point 46*b* with an IP address unique to the mobile station 34*b*-2 and typically assigned to the mobile station 34*b*-2 when contracting with an access provider for access to the wireless network 30. During the association process, the access point 46*b* assigns a 802 MAC address to the mobile station 34*b*-2 and, once the mobile station 34*b*-2 has been associated with the access point 46*b*, the access point 46*b* stores the IP and 802 MAC addresses for the mobile station 34*b*-2 in the WiARP proxy 50*b* , for example, by writing the IP and 802 MAC addresses for the mobile station 34*b*-2 to first and second fields, respectively, of an available entry in the WiARP proxy look-up table 56.

The access point 46*b* also notifies the DSG 36 of the association of the mobile station 34*b*-2 therewith by transmitting a notification message to the DSG via the distribution system 48. Unlike the information stored in the WiARP proxy 50*b*, however, the notification message transmitted to the DSG 36 contains the IP address for the mobile station 34*b*-2 and the 802 MAC address for the access point 34*b*. Upon receiving the notification message, the DSG 36 passes the IP address for the mobile station 34*b*-2 and the 802 MAC address for the access point 34*b* to the WiARP server 38. In turn, the WiARP server 38 stores the received IP and 802 MAC addresses in the WiARP server cache, for example, by writing the IP address for the mobile station 34*b*-2 and the 802 MAC address for the access point 46*b* with which the mobile station 34*b*-2 is associated in respective fields of an available entry in the WiARP server look-up table 52. Of course, by maintaining a record of the 802 MAC addresses for the access points 46*a*, 46*b* of the wireless network 30 at the DSG 36, the notification message from the access point 46*b* need only identify the access point originating the notification message and provide the IP address for the mobile station newly associated with that access point. The DSG 36 would then retrieve the 802 MAC address for the access point from which the notification message originated from memory and transmit the IP address for the mobile station 34*b*-2 and the 802 MAC address for the access point 46*b* with which the mobile station 34*b*-2 is associated to the WiARP server 38.

Having associated with the access point 46*b* (and thereby causing the subsequent updating of the WiARP proxy and WiARP server look-up tables 56 and 54), the mobile station 34*b*-2 may now receive IP packet data from an application server, for example, the application server 42, residing on the IP network 40. The method commences at step 50 and, at step 52, the application server 42 places an IP data packet on the IP network 40 addressed to the mobile station 34*b*-1. If the DSG 36 serves as the HA for the mobile station associated with the IP address contained in the IP data packet, here, the mobile station 34*b*-1, one or more routers (not shown) forming part of the IP network 40 direct the IP data packet to the DSG 36. Of course, if the mobile station 34*b*-1 has associated with an access point (not shown) which interfaces with the IP network 40 through another DSG, for example, the DSG 37, which serves as an FA for the mobile station associated with the IP address contained in the IP data packet, the mobile station will have advised the DSG 36 that it is being served by the DSG 37. Accordingly, upon arrival of the aforementioned IP data packet from the IP network 40, the DSG 36 will forward the IP data packet to the DSG 37 directly prior to utilization of the WiARP process hereinbelow described.

Proceeding on to step 54, upon arrival of the IP data packet at the DSG 36, the DSG 36 issues a WiARP query containing the IP address of the mobile station 34*b*-1 to the WiARP server 38. The WiARP query asks the WiARP server 38 if it knows the access point with which the mobile station 34*b*-1 having the indicated IP address is associated. Accordingly, at step 55, the WiARP server 38 checks the WiARP server table 52 for an entry containing an IP address matching the IP address provided thereto by the DSG 36. If, at step 56, the WiARP server 38 identifies an entry in the WiARP server look-up table 52 having a IP address in a first field thereof which matches the IP address of the received IP data packet, the WiARP server 38 constructs a WiARP response message which contains the corresponding 802 MAC address contained in a second field of the matching entry which, as previously set forth, is the 802 MAC address for the access point 44*b* currently serving the mobile station 34*b*-1. The WiARP response message constructed by the WiARP server 38 is then returned to the DSG 36 at step 57 and, at step 58, the DSG 36 inserts the IP data packet into an MAC frame and delivers the IP data packet to the access point 46*b* via the distribution system 48.

Continuing on to step 60, upon receipt of the IP data packet, the access point 46*b* issues a WiARP proxy query containing the IP address of the mobile station 34*b*-1 to the WiARP proxy 50*b* associated therewith. The WiARP proxy query asks the WiARP proxy 50*b* if the mobile station 34*b*-1 having the IP address contained in the WiARP proxy query is associated with the access point 46*b*. Accordingly, at step 61, the WiARP proxy 50*b* checks the WiARP proxy look-up table 56 for an entry containing an IP address matching the IP address provided thereto by the access point 46*b*. If, at step 62, the WiARP proxy 50*b* identifies an entry in the WiARP proxy look-up table 56 having a IP address in a first field thereof which matches the IP address contained in the WiARP proxy query, the WiARP proxy 50*b* constructs a WiARP proxy response message which contains the corresponding 802 MAC address contained in a second field of the matching entry which, as previously set forth, is the 802 MAC address for the mobile station 34*b*-1. The WiARP proxy response message constructed by the WiARP proxy 50*b* is then returned to the access point 46*b* at step 63 and, at step 64, the access point delivers the IP data packet to the mobile station 34*b*-2. The method then ends at step 66.

Returning now to step 56, if the WiARP server 38 fails to locate, in the WiARP server look-up table 52, an IP address which matches the IP address contained in the WiARP query, a WiARP server failure has occurred and the method instead proceeds to step 68 for handling of the WiARP server failure. At step 68, the WiARP server 38 broadcasts the WiARP query to each access point 46*a*, 46*b* of the wireless network 30. The path of the WiARP query will vary depending on the particular configuration of the wireless network 30. More specifically, if the WiARP server 38 is coupled to the DSG 36 as shown in FIG. 2, the WiARP server 38 will inform the DSG 36 of the WiARP failure. In turn, the DSG 36 will broadcast the WiARP query to the access points 46*a*, 46*b* via the distribution system 48. In the alternate embodiment (not shown) in which the WiARP server 38 is directly coupled to the distribution system 48, upon detecting a WiARP server failure, the WiARP server 38 will broadcast the WiARP query to the access points 46*a*, 46*b* via the distribution system 48 directly and will not need to advise the DSG 36 of the WiARP server failure.

Continuing on to step 70, upon receipt of the broadcast WiARP query, each access point 46*a*, 46*b* issues a WiARP proxy query containing the IP address of the mobile station 34*b*-1 to the WiARP proxy 50*a*, 50*b* associated therewith. As before, the WiARP proxy query asks the WiARP proxy 50*b* if the mobile station 34*b*-1 having the IP address contained in the WiARP proxy query is associated with the access point 46*b*. Accordingly, at step 70, the WiARP proxies 50*a*, 50*b* checks their respective WiARP proxy look-up table 56 for an entry containing an IP address matching the IP address provided thereto by the access point 46*b*. If, at step 72, one of the WiARP proxies 50*a* or 50*b* identifies an entry in the WiARP proxy look-up table 56 having a IP address in a first field thereof which matches the IP address contained in the WiARP proxy query, the method proceeds to step 74 where the WiARP proxy 50*a* or 50*b* advises the access point 46*a* or 46*b* associated therewith of the match.

The method then proceeds on to step 76, where the access point 46*a* or 46*b* responds to the WiARP query broadcast by the WiARP server 38 with a reply message containing the 802 MAC of the access point 46*a* or 46*b*. As before, the path of the response to the WiARP query will vary depending on the particular configuration of the wireless network 30. In the embodiment of the wireless network 30 illustrated in FIG. 2, the access point 46*a* or 46*b* will deliver the response message containing its 802 MAC address to the DSG 36 via the distribution system 48. In turn, the DSG 36 will pass the response message to the WiARP server 38. If the WiARP server 38 is coupled directly to the distribution system 48, however, the access point 46*a* or 46*b* will deliver the response message to the WiARP server 38 directly.

Having received a response to the WiARP query broadcast, the method proceeds to step 78 where the WiARP server 38 updates the WiARP server look-up table 56 with a new entry containing the IP address of the mobile station 34*b*-1 in a first field thereof and the 802 MAC address of the access point 46*a* or 46*b* which responded to the WiARP query broadcast. Having updated the WiARP server table 52 to include information related to the access point associated with the mobile station 34*b*-2, the method returns to step 57 where delivery of the IP data packet to the mobile station 34*b*-2 continues in the manner previously described.

Returning now to step 72, if, however, upon receiving the WiARP query broadcast, none of the WiARP proxies 50*a*, 50*b* identify a matching IP address in the proxy look-up table 56 associated therewith, none of the access points 46*a*, 46*b* will be advised of a match. Accordingly, none of the access points 46*a*, 46*b* will respond to the WiARP server query broadcast by the WiARP server 38. If no response to the WiARP server query broadcast by the WiARP server 38 is received thereby, the WiARP server 38 will discard the IP data packet received thereby at step 80. The method will then end at step 66.

Returning now to step 62, if the WiARP proxy 50*b* fails to locate, in the WiARP proxy look-up table 56, an IP address which matches the IP address contained in the WiARP proxy query, a WiARP proxy failure has occurred and the method instead proceeds to step 82 for handling of the WiARP proxy failure. At step 82, the WiARP proxy 50*b* advises the access point 46*b* of the WiARP proxy failure and, upon being notified of the WiARP proxy failure, the access point 46*b* broadcasts a WiARP proxy query containing the IP address of the mobile station 34*b*-1 to the other access points, here, the access point 42*a*, of the wireless network 30. Upon receipt of the WiARP proxy query, the method proceeds to step 84 where the access point 42*a* checks the contents of the WiARP proxy 50*a* for the IP address of the mobile station 34*b*-1. If the IP address of the mobile station 34*b*-1 is found in the WiARP proxy, for example, as an entry in the WiARP proxy table 56 for the WiARP proxy 50, the access point 42*a* replies to the WiARP proxy message by advising the access point 42*b* that the mobile station 34*b*-1 is associated with the access point 42*a*.

At step 86, the access point 42*b*, acting as an anchor access point, forwards the IP data packet delivered thereto by the DSG 36 to the access point 42*a* which answered the WiARP proxy query broadcast. Proceeding on to step 88, the access point 42*b* then transmits a WiARP redirect message to the WiARP server 38. Depending on the configuration of the wireless network 30*a*, the WiARP redirect message will either be passed to the WiARP server 38 by the DSG 36 (if the WiARP server 38 is coupled to the DSG 36) or transmitted directly to the WiARP server 38 (if the WiARP server 38 is coupled to the distribution system 48). The WiARP redirect message, which contains the IP address of the mobile station 34*b*-2 and the 802 MAC address or other unique identifier of the access point 42*a*, provides the WiARP server 38 with the information needed to update the WiARP server look-up table 52 to reflect that the mobile station 34*b*-2 is actually associated with the access point 42*a* and not with the access point 42*b*. The method then returns to step 64 for delivery of the IP data packet to the mobile station in the manner previously described.

Thus, there has been described and illustrated herein, a hierarchical wireless network in which selected WiARP functionality is implemented within a first, or wireline, level of the hierarchical wireless network. There has been further described and illustrated herein, a method for unicast delivery of IP data to mobile station which utilizes the WiARP functionality implanted in the wireline level of the hierarchical wireless network while routing the IP data through the hierarchical wireless network. By implementing this WiARP functionality into the wireline level of the hierarchical wireless network and utilizing the WiARP functionality when routing IP data through the hierarchical wireless network, wireless resources and battery life of mobile stations operating within the wireless network are conserved. However, those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. A hierarchical wireless network, comprising:
a first level, said first level includes a gateway wired to an IP network; and
a second level wired to said first level, said second level operable with a plurality of mobile stations and said second level is comprised of at least two access points operable with a respective plurality of mobile stations;
said first level maintaining, for each of plurality of mobile stations operable with said second level, a wireline address for said mobile station within said second level, said first level, for each mobile station associated with said second level by one of said at least two access points, an address of said access point to which said mobile station is associated;
said second level maintaining, for each of the plurality of mobile stations operable with said second level, a wireless address for said mobile station;
a distribution system for coupling said gateway to said at least two access points, said distribution system wired to said gateway and said at least two access points; and
a WiARP server wired to said gateway, said WiARP server maintaining, for each mobile station associated with said second level, a MAC address of said access point with which said mobile station is associated.

2. The hierarchical wireless network of claim 1, wherein each one of said at least two access points maintains a data store containing an IP address and a MAC address, linked to said IP address, for each mobile terminal associated with to said access point.

3. The hierarchical wireless network of claim 2, wherein said data store is a look-up table.

4. The hierarchical wireless network of claim 1, wherein each one of said at least two access points maintains a look-up table containing an entry for each mobile station associated therewith.

5. The hierarchical wireless network of claim 4, wherein each entry in said look-up table contains an IP address and a MAC address for a mobile terminal associated with said access point maintaining said look-up table.

6. The hierarchical wireless network of claim 1, wherein said gateway maintains, for each mobile station coupled to said second level, said MAC address of said access point with which said mobile station is associated.

7. The hierarchical wireless network of claim 1, wherein said WiARP server maintains a look-up table containing an entry for each mobile station associated with one of said at least one access points.

8. The hierarchical wireless network of claim 7, wherein each entry in said look-up table maintained in said WiARP server contains an IP address for a mobile terminal associated with one of said at least one access points and a MAC address for said access point with which said mobile terminal is associated.

9. The hierarchical wireless network of claim 1, wherein said WiARP server maintains a data store containing an IP address for each mobile terminal associated with one of said at least one access points and a MAC address, linked to said IP address, for said access point with which said mobile terminal is associated.

10. The hierarchical wireless network of claim 9, wherein said data store is a look-up table.

11. The hierarchical wireless network of claim 10, wherein each one of said at least two access points maintains a look-up table containing an entry for each mobile station associated therewith.

12. The hierarchical wireless network of claim 11, wherein each entry in said look-up table contains an IP address and a MAC address for a mobile terminal associated with said access point maintaining said look-up table.

13. The hierarchical wireless network of claim 10, wherein each one of said at least two access points maintains a look-up table containing an IP address and a MAC address, linked to said IP address, for a mobile terminal associated with said access point maintaining said look-up table.

14. For a wireless network comprised of at least two access points operable to interface with a select of a plurality of mobile stations, a gateway to an IP network and a distribution system coupling said at least two access points to said gateway, a method for unicast delivery of IP data to mobile stations associated with one of said at least two access points, comprising:
- linking an IP address for a mobile station to a MAC address for an access point with the select of the plurality of mobile stations;
- said gateway forwarding an IP data packet bearing said IP address to said access point having said MAC address linked to said IP address;
- said access point delivering said forwarded IP data packet to said mobile station having said IP address;
- maintaining a first data store at said gateway, said first data store comprised of IP addresses for each mobile station associated with one of said at least two access points of said wireless network and MAC addresses for each one of said at least two access points, each said IP address of a mobile station maintained in said first data store is linked to said MAC address for said access point with which said mobile station is associated
- receiving, at said gateway, an IP data packet form said IP network;
- determining an IP address of said received IP data packet;
- determining if said first data store includes an IP address matching said determined IP address; and
  - if said first data store includes an IP address matching said determined IP address, forwarding said received IP data packet to said access point having said MAC address linked to said matching IP address.

15. The method of claim 14, wherein said access point delivering said forwarded IP data packet to said mobile station having said IP address further comprises:
- linking said IP address for said mobile station to a MAC address for said mobile station; and
- said access point delivering said forwarded IP data packet bearing said IP address to said mobile station having said MAC address linked to said IP address.

16. The method of claim 14, and further comprising maintaining a second data store at each one of said at least two access points, said second data store at each one of said at least two access points comprised of IP and MAC addresses for each mobile station associated with that access point.

17. The method of claim 16, and further comprising:
- if said first data store does not have an IP address matching said determined IP address, broadcasting said determined IP address to each one of said at least two access points of said wireless network;
- if said second data store of one of said at least two access points includes an IP address matching said determined IP address, said access point having said second data store which includes said matching IP address transmitting its MAC address to said gateway; and
- said gateway forwarding said received IP data packet bearing said IP address to said access point which transmitted its MAC address thereto.

18. The method of claim 17, and further comprising, prior to forwarding said received IP data packet, linking said determined IP address to said MAC address transmitted thereto.

19. The method of claim 18, and farther comprising said gateway discarding said received IP data packet if none of said at least two access points transmits its MAC address to said gateway in response to said broadcast of said determined IP address.

20. The method of claim 14, wherein said access point delivering said forwarded IP data packets to said mobile station having said IP address further comprises:
- linking said IP address for said mobile station to a MAC address for said mobile station; and
- said access point delivering said forwarded IP data packet to said mobile station having said MAC address linked to said IP address.

21. The method of claim 20, and further comprising maintaining a second data store at each one of said at least two access points, said second data store at each one of said at least two access points comprised of IP and MAC addresses for each mobile station associated with that access point.

22. The method of claim 21, wherein said IP and MAC addresses for each mobile station maintained in said second data store are linked to one another.

23. The method of claim 22, and further comprising:
- determining, at said access point receiving said IP packet, said IP address of said received IP data packet;
- determining if said second data store includes an IP address matching said determined IP address; and
- if said second data store includes an IP address matching said determined IP address, forwarding said received IP data packet to said mobile station having said MAC address linked to said matching IP address.

24. The method of claim 23, and further comprising:
- if said second data store does not have an IP address matching said IP address of said received IP data packet, said access point broadcasting said IP address of said received IP data packet to the other access points of said wireless network;
- if said second data store of an other access point of said wireless network includes an IP address matching said IP address broadcast by said access point, said other access point notifying said broadcasting access point of said matching IP address;
- said broadcasting access point forwarding said received IP data packet to said other access point; and
- said other access point delivering said forwarded IP data packet to a mobile station having a MAC address linked to said matching IP address.

25. The method of claim 24, and further comprising said broadcasting access point providing said gateway with an updated MAC address for linking with said IP address, said updated MAC address being said MAC address for said other access point.

26. A hierarchical wireless network, comprising:
- a first level, said first level includes a gateway wired to an IP network; and
- a second level wired to said first level, said second level operable with a plurality of mobile stations and said second level is comprised of at least two access points operable with a respective plurality of mobile stations;
- said first level maintaining, for each of the plurality of mobile stations operable with said second level, a wireline address for said mobile station within said second level, said first level, for each mobile station associated with said second level by one of said at least two access points, an address of said access point to which said mobile station is associated;
- said second level maintaining, for each of the plurality of mobile stations operable with said second level, a wireless address for said mobile station;
- a distribution system for coupling said gateway to said at least two access points, said distribution system wired to said gateway and said at least two access points; and
- a WiARP server wired to said distribution system, said WiARP server maintaining, for each mobile station associated with said second level, a MAC address of said access point with which said mobile station is associated.

27. The hierarchical wireless network of claim 26, wherein said WiARP server maintains a data store containing an IP address for each mobile terminal associated with one of said at least one access points and a MAC address, linked to said IP address, for said access point with which said mobile terminal is associated.

* * * * *